(12) United States Patent
Qiu (10) Patent No.: US 11,768,736 B2
(45) Date of Patent: Sep. 26, 2023

(54) STORAGE SYSTEM BOOT METHOD AND APPARATUS, AND COMPUTER-READABLE STORAGE MEDIUM

(71) Applicant: INSPUR SUZHOU INTELLIGENT TECHNOLOGY CO., LTD., Jiangsu (CN)

(72) Inventor: Xingping Qiu, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/920,844

(22) PCT Filed: Jan. 27, 2021

(86) PCT No.: PCT/CN2021/073869
§ 371 (c)(1),
(2) Date: Oct. 24, 2022

(87) PCT Pub. No.: WO2021/212948
PCT Pub. Date: Oct. 28, 2021

(65) Prior Publication Data
US 2023/0117996 A1  Apr. 20, 2023

(30) Foreign Application Priority Data
Apr. 23, 2020 (CN) .......................... 202010327116.1

(51) Int. Cl.
*G06F 11/00* (2006.01)
*G06F 11/14* (2006.01)
(Continued)

(52) U.S. Cl.
CPC ........ *G06F 11/1417* (2013.01); *G06F 9/4411* (2013.01); *G06F 13/4221* (2013.01); *G06F 2201/805* (2013.01); *G06F 2213/0026* (2013.01)

(58) Field of Classification Search
CPC ............. G06F 11/1402; G06F 11/1417; G06F 11/1438; G06F 11/1441; G06F 9/4411;
(Continued)

(56) References Cited

U.S. PATENT DOCUMENTS

2011/0082959 A1    4/2011  Ageishi
2014/0237301 A1*   8/2014  Mejia ................... G06F 13/4282
                                                        714/47.1
(Continued)

FOREIGN PATENT DOCUMENTS

CN    103809988 A    5/2014
CN    106951383 A    7/2017
(Continued)

OTHER PUBLICATIONS

International Search Report cited in PCT application PCT/CN2021/073869, dated Apr. 22, 2021, 6 pages.
(Continued)

*Primary Examiner* — Michael Maskulinski
(74) *Attorney, Agent, or Firm* — COOPER LEGAL GROUP, LLC (57) ABSTRACT

Provided are a storage system boot method and apparatus, and a computer-readable storage medium. The method includes: determining a configuration space by a bridge device; during booting a Basic Input Output System, after an initialization of a Peripheral Component Interconnect Express (PCIe) device is detected, determining, by connection information read from the configuration space, whether the preset hardware device is connected; if YES, continuing
(Continued)

booting until finished; if NO, sending a reconnection instruction to stabilize a speed of a PCIe hardware link; when a number of the reconnection instruction sent is greater than a first preset value and the preset hardware device fails to be connected, sending a system reboot instruction; and when the number is less than the first preset value, continuing to determine whether the preset hardware device is connected after waiting for a preset duration.

20 Claims, 3 Drawing Sheets

(51) Int. Cl.
*G06F 9/4401* (2018.01)
*G06F 13/42* (2006.01)

(58) Field of Classification Search
CPC ......... G06F 13/4221; G06F 2213/0026; G06F 2201/805
See application file for complete search history.

(56) References Cited

U.S. PATENT DOCUMENTS

2015/0092828 A1* 4/2015 Desimone ............... H04L 25/14
 375/232
2019/0354453 A1* 11/2019 Hsu ......................... G06F 11/24

FOREIGN PATENT DOCUMENTS

| CN | 107145198 A | 9/2017 |
| CN | 110377469 A | 10/2019 |
| CN | 111030778 A | 4/2020 |
| CN | 111538539 A | 8/2020 |

OTHER PUBLICATIONS

Written Opinion of International Searching Authority cited in PCT application PCT/CN2021/073869, dated Apr. 22, 2021, 10 pages.
Notification of Patent Grant of corresponding CN priority application CN202010327116.1, dated Jun. 28, 2022, 2 pages.

* cited by examiner

STORAGE SYSTEM BOOT METHOD AND APPARATUS, AND COMPUTER-READABLE STORAGE MEDIUM

This application claims priority to Chinese Patent Application No. 202010327116.1, filed on Apr. 23, 2020, in China National Intellectual Property Administration and entitled "Storage System Boot Method and Apparatus, and Computer-Readable Storage Medium", the contents of which are hereby incorporated by reference in its entirety.

FIELD

The present application relates to a technical field of hardware device failure detection, and particularly to a storage system boot method and apparatus, and a computer-readable storage medium.

BACKGROUND

With rapid development of big data, cloud technology, and Internet of things technology, computer network technology has been applied in all walks of life, data has grown explosively, and requirements of users for a stability and maintainability of storage devices have increased.

In the related art, a storage system is booted immediately after a Basic Input Output System (BIOS) is booted. It can be understood that normal operation of the storage system is highly dependent on and related to a hardware environment. For example, data synchronization and backup between two controllers in the storage system depends on normal operation of Non-Transparent Bridge (NTB) hardware. A storage environment has a relatively high requirement for the stability of hardware links. In application to various complex environments, failures of Peripheral Component Interconnect Express (PCIe) links are unavoidable, and the booted storage system may inevitably operate abnormally due to hardware link failures.

In view of this, how to ensure that a storage system may work normally and safely after booting, ensure normal connection of a hardware device that the storage system depends on in quality inspection of a BIOS, reduce the probability of system error caused by a device exception after booting of the storage system, and improve the stability and maintainability of a whole system is a technical problem to be solved by those skilled in the art.

SUMMARY

The present application provides a storage system boot method and apparatus, and a computer-readable storage medium, so as to ensure that a storage system may work normally and safely after booting, ensure normal connection of a hardware device that the storage system depends on in quality inspection of a BIOS, reduce probability of system error caused by a device exception after booting of the storage system, and improve a stability and maintainability of a whole system.

In order to solve the foregoing technical problem, embodiments of the present application provide the following technical solutions.

An aspect of the embodiments of the present application provides a storage system boot method, including:

determining, based on a hardware connection relationship on a motherboard, a bus number, a device number, and a function number of a bridge device for connecting a PCIe device with a Central Processing Unit (CPU), so as to position a configuration space of the bridge device;

during boot of a BIOS, after completion of that initialization of the PCIe device is detected, determining, according to connection information of a preset hardware device read from the configuration space, whether the preset hardware device is successfully connected, and the preset hardware device is a hardware device associated with a storage system on the motherboard;

if YES, continuing booting until the boot of the BIOS is finished; if NO, sending, by the CPU, a reconnection instruction to stabilize a speed of a PCIe hardware link in a matched state by means of adjusting a parameter of a sending end and a parameter of a receiving end;

when that a number of times that the CPU sends the reconnection instruction is greater than a first preset value is detected and that the preset hardware device fails to be connected is detected, sending, by the BIOS, a system reboot instruction; and when that the number of times that the CPU sends the reconnection instruction is not greater than the first preset value is detected, continuing to determine whether the preset hardware device is successfully connected after waiting for a preset duration.

In some embodiments, the stabilizing a speed of a PCIe hardware link in a matched state by means of adjusting a parameter of a sending end and a parameter of a receiving end includes:

modifying a default preset value to a preset parameter value, and sending the preset parameter value to the PCIe device at a Gen1 rate or a Gen2 rate; and when the PCIe hardware link reaches a Gen3 rate, and a detected error rate of each receiving end is less than $1e^{-4}$, adjusting the parameter of the sending end and the parameter of the receiving end until the detected error rate of each receiving end is less than $1e^{-12}$, so as to stabilize a two ends parameterized link in a Gen3 state.

The adjusting the parameter of the sending end and the parameter of the receiving end includes:

adjusting, by the PCIe device, a receiving parameter according to a first preset parameter adjusting range so as to optimize a sending parameter of the CPU; and adjusting, by the CPU, the receiving parameter according to a second preset parameter adjusting range so as to optimize a sending parameter of the PCIe device.

In some embodiments, the determining, according to connection information of a preset hardware device read from the configuration space, whether the preset hardware device is successfully connected includes:

determining whether a connection state of the preset hardware device read from the configuration space is an incorrectly connected state or whether a connection bandwidth is x0;

if YES, determining that the preset hardware device fails to be connected; and if NO, determining that the preset hardware device is successfully connected.

In some embodiments, the sending, by the BIOS, a system reboot instruction includes:

sending, by the BIOS, a global reset command to reboot the whole system; and if a number of times that the BIOS sends the global reset command is greater than a second preset value, and the preset hardware device fails to be connected, generating an alert log, sending the alert log to a Baseboard Management Controller (BMC), and simultaneously continuing booting until the boot of the BIOS is finished, and the alert log includes alert prompting information and log records from time when the boot of the BIOS is started to current time.

In some embodiments, reading a value of the number of times that the BIOS sends the global reset command from a Complementary Metal Oxide Semiconductor (CMOS) register.

A further aspect of the embodiments of the present application provides a storage system boot apparatus, including:
a configuration space determination module, configured to determine, based on a hardware connection method on a motherboard, a bus number, a device number, and a function number of a bridge device for connecting a PCIe device with a CPU, so as to position a configuration space of the bridge device;
a hardware connection determination module, configured to, during boot of a BIOS, after completion of initialization of the PCIe device is detected, determine, according to connection information of a preset hardware device read from the configuration space, whether the preset hardware device is successfully connected, and further configured to, when that a number of times that the CPU sends a reconnection instruction is not greater than a first preset value is detected, continue to determine whether the preset hardware device is successfully connected after waiting for a preset duration, and the preset hardware device is a hardware device associated with a storage system on the motherboard;
a boot module, configured to, if the preset hardware device is successfully connected, continue booting until the boot of the BIOS is finished;
a reconnection module, configured to, if the preset hardware device fails to be connected, send, by the CPU, the reconnection instruction to stabilize a speed of a PCIe hardware link in a matched state by means of adjusting a parameter of a sending end and a parameter of a receiving end; and
a reboot module, configured to, when that the number of times that the CPU sends the reconnection instruction is greater than the first preset value is detected and that the preset hardware device fails to be connected is detected, send, by the BIOS, a system reboot instruction.

In some embodiments, the reconnection module includes:
a parameter modification submodule, configured to modify a default preset value to a preset parameter value, and send the preset parameter value to the PCIe device at a Gen1 rate or a Gen2 rate; and
a parameter adjustment submodule, configured to, when the PCIe hardware link reaches a Gen3 rate, and a detected error rate of each receiving end is less than $1e^{-4}$, adjust the parameter of the sending end and the parameter of the receiving end until the detected error rate of each receiving end is less than $1e^{-12}$, so as to stabilize the two ends parameterized link in a Gen3 state. The adjusting the parameter of the sending end and the parameter of the receiving end includes:
adjusting, by the PCIe device, a receiving parameter according to a first preset parameter adjusting range so as to optimize a sending parameter of the CPU; and
adjusting, by the CPU, the receiving parameter according to a second preset parameter adjusting range so as to optimize a sending parameter of the PCIe device.

In some embodiments, the reboot module includes:
an instruction transmission submodule, configured to send, by the BIOS, a global reset command to reboot the whole system; and
an alert log generation submodule, configured to, if a number of times that the BIOS sends the global reset command is greater than a second preset value, and the preset hardware device fails to be connected, generate an alert log, send the alert log to a BMC, and simultaneously continue booting until the boot of the BIOS is finished, and the alert log includes alert prompting information and log records from time when the boot of the BIOS is started to current time.

The embodiments of the present application also provide a storage system boot apparatus, including a processor configured to execute a computer program stored in a memory to implement any steps of the storage system boot method.

Finally, the embodiments of the present application also provide a computer-readable storage medium, storing a storage system boot program that is executed by a processor to implement any steps of the storage system boot method.

The technical solutions provided in the present application have the following advantages. An in-position hardware device associated with a storage system is detected during boot of a BIOS, and if any exception is found, is reset and reconnected in multiple manners. As such, the stability of the stability of the associated hardware device during the boot of the BIOS is ensured, a more stable hardware link is provided for a storage environment, and the probability that the hardware link fails is reduced. Therefore, it is ensured that the storage system may work normally and safely after booting, normal connection of the hardware device that the storage system depends on in quality inspection of a BIOS is ensured, the probability of system error caused by a device exception after booting of the storage system is reduced, maintenance and failure positioning of a failing hardware link may be implemented timely, and the stability and maintainability of the whole system may be improved.

In addition, the embodiments of the present application also provide a corresponding implementation apparatus for the storage system boot method and a computer-readable storage medium, so as to further making the method more practicable. The apparatus and the computer-readable storage medium have corresponding advantages.

It is to be understood that the above general description and the following detailed description are only exemplary and not intended to limit the present application.

BRIEF DESCRIPTION OF THE DRAWINGS

In order to describe technical solutions in embodiments of the present application or the related art more clearly, drawings required to be used in descriptions about the embodiments or the related art will be introduced briefly below. Apparently, the drawings in description below are only some embodiments of the present application. Those ordinarily skilled in the art may further obtain other drawings according to these drawings without creative work.

DETAILED DESCRIPTION

In order to make solutions of the present application understood better by those skilled in the art, the present application will be further described below in detail in combination with drawings and implementation modes. Clearly, described embodiments are not all but only part of embodiments of the present application. All other embodiments obtained by those ordinarily skilled in the art based on the embodiments in the present application without creative work shall fall within scope of protection of the present application.

Terms "first", "second", "third", "fourth", etc., in specification, claims, and drawings of the present application are for distinguishing different objects rather than describing a sequence. In addition, terms "include" and "have" and any variation thereof are intended to cover nonexclusive inclusions. For example, a process, a method, a system, a product, or a device including a series of steps or units is not limited to listed steps or units but may include steps or units that are not listed.

After an introduction of the technical solutions of the embodiments of the present application, various unrestrictive implementation modes of the present application will now be described in detail.

Figure 1:
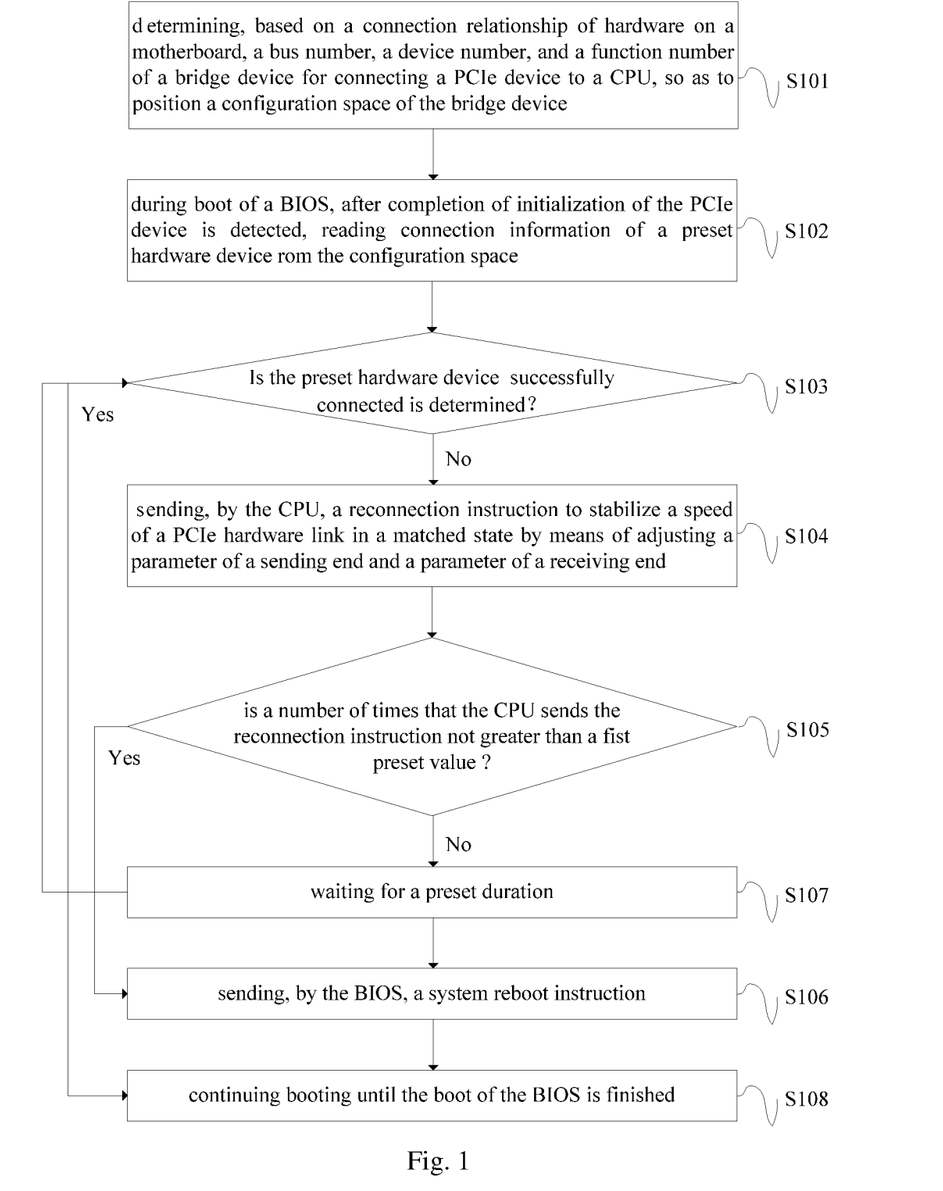
FIG. 1 is a schematic flowchart of a storage system boot method according to some embodiments of the present application.

First, referring to FIG. 1, FIG. 1 is a schematic flowchart of a storage system boot method according to some embodiments of the present application. The embodiments of the present application may include following contents.

In S101, a bus number, a device number, and a function number of a bridge device for connecting a PCIe device to a Central Processing Unit (CPU) are determined based on a connection method of hardware on a motherboard, so as to position a configuration space of the bridge device.

The connection method of the hardware on the motherboard may be obtained based on a design drawing of the motherboard. A bus number, a device number, and a function number of a CPU root port connected with a related PCIe device may be determined according to the connection method of the hardware on the motherboard. The bus number, the device number, and the function number may uniquely determine or identify a hardware device. After the configuration space of the bridge device is determined, a connection state, connection bandwidth, and other connection information of connection of the PCIe device and the CPU root may be acquired from the configuration space.

In S102, during boot of a BIOS, after completion of initialization of the PCIe device is detected, connection information of a preset hardware device is read from the configuration space.

In the present application, the preset hardware device is a hardware device associated with a storage system on the motherboard, i.e., a hardware device that the storage system depends on. Whether the hardware device is normal affects a normal operation state of the storage system.

In S103, whether the preset hardware device is successfully connected is determined. If NO, S104 is performed. If YES, S108 is performed.

After the boot of the BIOS in S102, after a program runs a PCIe initialization related module, a connection state of the related hardware device is detected. The connection state may be determined according to information stored in the configuration space of the bridge device. For example, a connection state standard value or a connection bandwidth standard value corresponding to successful connection of the hardware device may be preset. When a connection state value or connection bandwidth value in the configuration space is not a preset standard value, it indicates that the hardware device fails to be connected. In some embodiments, whether the connection state of the preset hardware device read from the configuration space is an incorrectly connected state or whether the connection bandwidth is x0 is determined. If YES, the preset hardware device fails to be connected. If NO, the preset hardware device is successfully connected. For example, a speed corresponding to a correctly connected state is Gen3, and if it is not Gen3 read from the configuration space, the hardware device fails to be connected.

In S104, the CPU sends a reconnection instruction to stabilize a speed of a PCIe hardware link in a matched state by means of adjusting a parameter of a sending end and a parameter of a receiving end.

Stabilizing the speed of the PCIe hardware link in the matched state refers to matching the speed of the PCIe hardware link with the PCIe device by finely adjusting the parameter of the sending end and the parameter of the receiving end. For a PCIe 3.0 device, the matched state is that a speed of a link is stabilized in a Gen3 state.

In S105, whether a number of times that the CPU sends the reconnection instruction is not greater than a first preset value and whether the preset hardware device fails to be connected are determined. If YES, S106 is performed. If NO, S107 is performed.

In the present application, an N value, which is the number of times reconnection is tried, may be preset and may be selected based on a practical application scenario and a parameter of the hardware device, taking into account system boot efficiency and the failure diagnosis efficiency. No limits are made thereto in the present application.

In S106, the BIOS sends a system reboot instruction.

In S107, S103 is performed after waiting for a preset duration.

For example, the preset duration, which may be selected according to an actual situation without affecting the implementation of the present application, may be 10 s.

In S108, booting is continued until the boot of the BIOS is finished.

In a technical solution provided in the embodiments of the present application, an in-position hardware device associated with the storage system is detected during the boot of the BIOS, and if any exception is found, the storage system is reset and reconnected in multiple manners. As such, the stability of the hardware device associated with the storage system during the boot of the BIOS is ensured, a more stable hardware link is provided for a storage environment, and the probability that the hardware link fails is reduced. Therefore, it is ensured that the storage system may work normally and safely after booting, normal connection of the hardware device that the storage system depends on in quality inspection of a BIOS is ensured, the probability of system error caused by a device exception after booting of the storage system is reduced, maintenance and failure positioning of a failing hardware link may be implemented timely, and the stability and maintainability of a whole system may be improved.

How to perform a step of stabilizing the speed of the PCIe hardware link in the matched state by means of adjusting the parameter of the sending end and the parameter of the receiving end is not limited in an above-mentioned embodiment. Some implementation modes are provided in the present embodiment, which may include following steps.

A default preset value is modified to a preset parameter value, and the preset parameter value is sent to the PCIe device at a Gen1 rate or a Gen2 rate. When the PCIe hardware link reaches a Gen3 rate, and a detected error rate of each receiving end is less than $1e^{-4}$, the parameter of the sending end and the parameter of the receiving end are adjusted until the detected error rate of each receiving end is less than $1e^{-12}$, so as to stabilize a two ends parameterized link in a Gen3 state.

It can be understood that a rate of PCIe increases, while signal transmission losses of ordinary Printed Circuit Boards (PCBs) and plug connectors are relatively high, so a de-emphasis technology is used at a sending end in PCIe G1 and G2. That is, the sending end, when sending a signal, sends a signal (representing a low-frequency component in the signal) after a transition bit at a reduced amplitude. As such, an attenuation of a high-frequency component by a transmission line may be partially compensated, to obtain a relatively good eye pattern (a signal swing is slight, an eye pattern height is small, a power consumption is low, and an Electromagnetic Compatibility (EMC) radiation is low). De-emphasis of −3.5 dB is used in PCIe G1, and de-emphasis of −3.5 dB and −6 dB is used in G2. Due to a higher signal rate, a more complex second-order de-emphasis technology is required by G3. That is, in addition to that sending the transition bit at a reduced amplitude, a previous bit of the transition bit is sent at an increased amplitude, and the increased amplitude is generally referred to as preshoot. In order to cope with a complex link environment, totally 11 different combinations of preshoot and de-emphasis, i.e., preset, are specified in PCIe G3, and in general, this value is automatically set to a default value. In case of unsuccessful connection, the default preset needs to be reset.

In the embodiments of the present application, a step that the parameter of the sending end and the parameter of the receiving end are adjusted includes following steps.

The PCIe device adjusts a receiving parameter according to a first preset parameter adjusting range so as to optimize a sending parameter of the CPU. The CPU adjusts a receiving parameter according to a second preset parameter adjusting range so as to optimize a sending parameter of the PCIe device.

A rate of a PCIe 3.0 signal may reach 8 Gb/s, and a link channel line may be very long, so the high-speed signal may be attenuated excessively, and an open eye pattern may not be obtained at the receiving end. Therefore, equilibrium settings are used for both the receiving end and the sending end of PCIe 3.0, to compensate the attenuation of high-speed signals in case of a long link. In PCIe 3.0, a dynamic equilibrium method is used to automatically implement and configure an optimal equilibrium combination to meet requirements at different time. That is, the system may automatically analyze the performance of the high-speed signal, such as the eye pattern, at the receiving end according to a link condition, and guide the sending end and the receiving end according to an analysis result to set equilibrium parameters. When devices at the sending end and receiving end of PCIe 3.0 are initialized to work, the system may ask, according to an analysis situation of the link, the receiving end to send a TxEQ Preset setting request to the sending end to ask the sending end to perform corresponding Preset equilibrium setting, and the sending end may send an RxEQ equilibrium setting request to the receiving end to ask the receiving end to perform corresponding RxEQ setting. By such an initialization process, an optimal equilibrium setting is obtained, so as to obtain an optimal high-speed signal (the eye pattern) at the receiving end.

It is also to be noted that, if the speed of the PCIe hardware link fails to be stabilized in the matched state by means of adjusting the parameter of the sending end and the parameter of the receiving end through the steps in an above-mentioned embodiment, the CPU may try to perform reconnection at the Gen2 rate rather than the Gen3 rate. That is, a default preset value is modified to a preset parameter value, and the preset parameter value is sent to the PCIe device at the Gen1 or the Gen2 rate. When the PCIe hardware link reaches the Gen2 rate, and a detected error rate of each receiving end is less than $1e^{-4}$, the parameter of the sending end and the parameter of the receiving end are adjusted until the detected error rate of each receiving end is less than $1e^{-12}$, so as to stabilize the two ends parameterized links in a Gen2 state. The step that the parameter of the sending end and the parameter of the receiving end are adjusted includes that: the PCIe device adjusts the receiving parameter according to the first preset parameter adjusting range so as to optimize the sending parameter of the CPU; and the CPU adjusts the receiving parameter according to the second preset parameter adjusting range so as to optimize the sending parameter of the PCIe device.

In above-mentioned embodiments, if it is found during the boot that the associated hardware device is exceptional, the hardware device is reconnected for many times, the system is reset for many times if the hardware device is still exceptional, and if there is an important hardware device that may not return to normal, the system transmits alert information through an external control system for manual positioning and repair. That is, following steps are further included.

If a number of times that the CPU sends the reconnection instruction is greater than a first preset value, the BIOS sends a global reset command to reboot the whole system. The global reset command is directly transmitted by the BIOS to a register of a southbridge chip controller. If a number of times that the BIOS sends the global reset command is greater than a second preset value, and the preset hardware device fails to be connected, an alert log is generated, the alert log is sent to a BMC, and booting is simultaneously continued until the boot of the BIOS is finished. The alert log includes alert prompting information and log records from time when the boot of the BIOS is started to current time. A value of the number of times the BIOS sends the global reset command may be read from a CMOS register.

When it is detected that the related hardware device fails to be connected, the BIOS sends a global reset command to reboot the whole system for m times. In case of a success, booting is continued. In case of a failure, an alert log is printed and sent to the BMC or another control system for an engineer to view remotely, and the system continues to be booting.

It is to be noted that the steps in the present application are executed not strictly in sequence, and as long as satisfying a logical sequence, these steps may be executed at the same time or according to a certain preset sequence. FIG. 1 is only schematic and not intended to limit the steps to such an execution sequence.

Some embodiments of the present application also provide a corresponding apparatus for the storage system boot method, so as to further make the method more practicable. The apparatus may be described from the angles of function module and hardware respectively. The storage system boot apparatus provided in the embodiments of the present application will be introduced below. The storage system boot apparatus described below may make corresponding references mutually with the storage system boot method described above.

Figure 2:
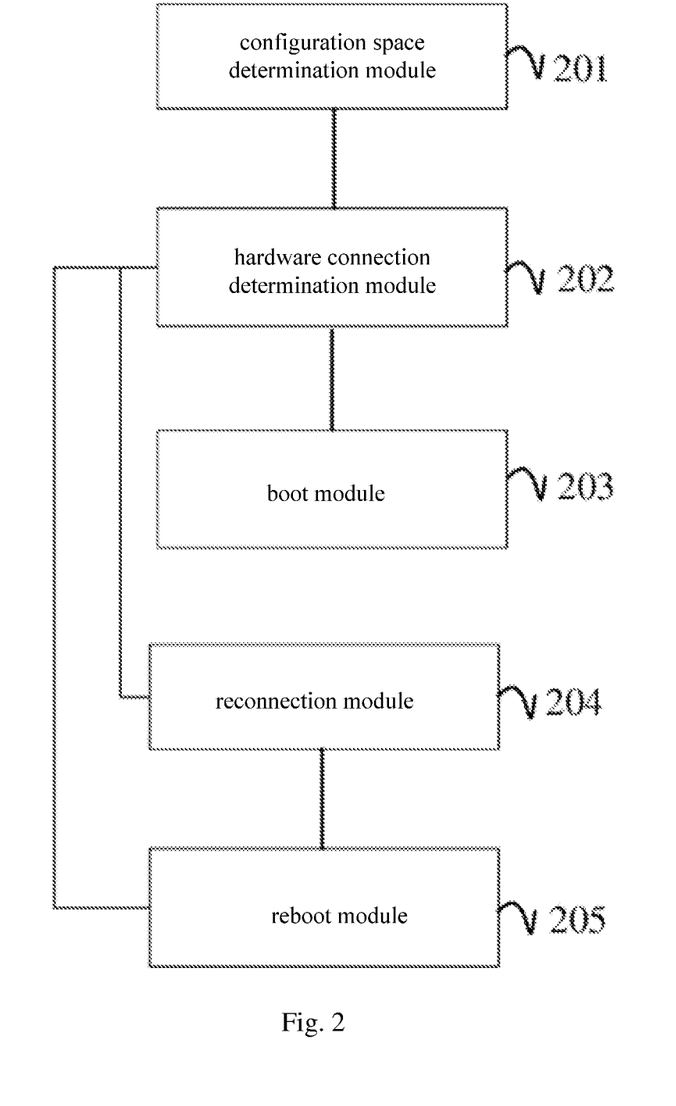
FIG. 2 is a schematic structural diagram of some implementation modes of a storage system boot apparatus according to some embodiments of the present application.

From an angle of function module, referring to FIG. 2, FIG. 2 is a schematic structural diagram of some implementation modes of a storage system boot apparatus according to some embodiments of the present application. The apparatus may include:

a configuration space determination module 201, configured to determine, based on a hardware connection method on a motherboard, a bus number, a device number, and a function number of a bridge device for connecting a PCIe device to a CPU, so as to position a configuration space of the bridge device;

a hardware connection determination module 202, configured to, during boot of a BIOS, after completion of initialization of the PCIe device is detected, determine, according to connection information of a preset hardware device read from the configuration space, whether the preset hardware device is successfully connected, and further configured to, when that a number of times that the CPU sends a reconnection instruction is not greater than a first preset value is detected, continue to determine whether the preset hardware device is successfully connected after waiting for a preset duration, and the preset hardware device is a hardware device associated with a storage system on the motherboard;

a boot module 203, configured to, if the preset hardware device is successfully connected, continue booting until the boot of the BIOS is finished;

a reconnection module 204, configured to, if the preset hardware device fails to be connected, send, by the CPU, the reconnection instruction to stabilize a speed of a PCIe hardware link in a matched state by means of adjusting a parameter of a sending end and a parameter of a receiving end; and a reboot module 205, configured to, when that the number of times that the CPU sends the reconnection instruction is greater than the first preset value is detected and the preset hardware device fails to be connected is detected, send, by the BIOS, a system reboot instruction.

In some embodiments, in some other implementation modes of the present embodiment, the reconnection module 204 may further include:

a parameter modification submodule, configured to modify a default preset value to a preset parameter value, and send the preset parameter value to the PCIe device at a Gen1 rate or a Gen2 rate; and a parameter adjustment submodule, configured to, when the PCIe hardware link reaches a Gen3 rate, and a detected error rate of each receiving end is less than $1e^{-4}$, adjust the parameter of the sending end and the parameter of the receiving end until the detected error rate of each receiving end is less than $1e^{-12}$, so as to stabilize the two ends parameterized link in a Gen3 state. The adjusting the parameter of the sending end and the parameter of the receiving end includes:

adjusting, by the PCIe device, a receiving parameter according to a first preset parameter adjusting range so as to optimize a sending parameter of the CPU; and adjusting, by the CPU, the receiving parameter according to a second preset parameter adjusting range so as to optimize a sending parameter of the PCIe device.

As some implementation modes, the reboot module 205 may further include, for example:

an instruction transmission submodule, configured to send, by the BIOS, a global reset command to reboot the whole system; and an alert log generation submodule, configured to, if a number of times that the BIOS sends the global reset command is greater than a second preset value, and the preset hardware device fails to be connected, generate an alert log, send the alert log to a BMC, and simultaneously continue booting until the boot of the BIOS is finished, and the alert log includes alert prompting information and log records from time when the boot of the BIOS is started to current time.

In some embodiments, in some other implementation modes of the present embodiment, the apparatus may further include, for example:

a connection failure determination submodule, configured to, if a connection state of the preset hardware device read from the configuration space is an incorrectly connected state or a connection bandwidth is x0, determine that the preset hardware device fails to be connected;

a connection success determination submodule, configured to, if the connection state of the preset hardware device read from the configuration space is not the incorrectly connected state or the connection bandwidth is not x0, determine that the preset hardware device is successfully connected.

The function of each function module of the storage system boot apparatus as described in the embodiments of the present application may be realized according to the method in the method embodiment, and a realization process thereof may refer to the related descriptions in the method embodiment, and will not be elaborated herein.

It can be seen from the above that, in the embodiments of the present application, it is ensured that the storage system may work normally and safely after booting, normal connection of a hardware device that the storage system depends on in quality inspection of a BIOS is ensured, the probability of system error caused by a device exception after booting of the storage system is reduced, and the stability and maintainability of the whole system are improved.

Figure 3:
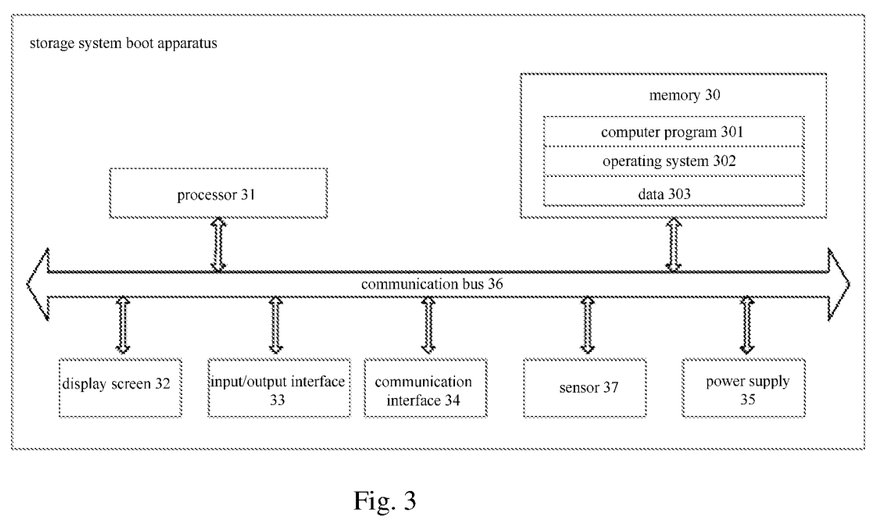
FIG. 3 is a schematic structural diagram of some implementation modes of a storage system boot apparatus according to some embodiments of the present application.

The storage system boot apparatus mentioned above is described from the angle of function module. Further, the present application also provides a storage system boot apparatus described from the angle of hardware. FIG. 3 is a schematic structural diagram of another storage system boot apparatus according to some embodiments of the present application. As shown in FIG. 3, the apparatus includes: a memory 30, configured to store a computer program; and a processor 31, configured to execute the computer program to implement the steps of the storage system boot method mentioned in the above embodiment.

The processor 31 may include one or more processing cores, such as a 4-core processor, and an 8-core processor. The processor 31 may be implemented by at least one of hardware forms of a Digital Signal Processor (DSP), a Field-Programmable Gate Array (FPGA), and a Programmable Logic Array (PLA). Alternatively, the processor 31 may include a main processor and a co-processor. The main processor, also referred to as a CPU, is a processor configured to process data in an awake state. The co-processor is a low-power processor configured to process data in a standby state. In some embodiments, the processor 31 may be integrated with a Graphics Processing Unit (GPU) that is configured to render and draw contents to be displayed by a display screen. In some embodiments, the processor 31 may include an Artificial Intelligence (AI) processor that is configured to process calculation operations about machine learning.

The memory 30 may include one or more computer-readable storage media that may be non-transitory. Alternatively, the memory 30 may include a high-speed Random Access Memory (RAM) and a nonvolatile memory, such as one or more disk storage devices and flash storage devices. In the present embodiment, the memory 30 is at least configured to store the following computer program 301 that may be loaded and executed by the processor 31 to implement the related steps of the storage system boot method disclosed in any one of the above-mentioned embodiments. In addition, resources stored in the memory 30 may further include an operating system 302, data 303, etc., that are stored temporarily or permanently. The operating system 302 may include Windows, Unix, Linux, etc. The data 303 may include, but not limited to, data corresponding to a storage system boot result, etc.

In some embodiments, the storage system boot apparatus may further include a display screen 32, an input/output interface 33, a communication interface 34, a power supply 35, and a communication bus 36.

It can be understood by those skilled in the art that the structure shown in FIG. 3 does not form limitations on the storage system boot apparatus, and more or fewer components than those shown in the figure may be included, such as a sensor 37.

The function of each function module of the storage system boot apparatus as described in the embodiments of the present application may be realized according to the method in the method embodiment, and a realization process thereof may refer to the related descriptions in the method embodiment, and will not be elaborated herein.

It can be seen from the above that, in the embodiments of the present application, it is ensured that a storage system may work normally and safely after booting, normal connection of a hardware device that the storage system depends on in quality inspection of a BIOS is ensured, the probability of system error caused by a device exception after booting of the storage system is reduced, and the stability and maintainability of the whole system are improved.

It can be understood that, when being implemented in form of a software function unit and sold or used as an independent product, the storage system boot method in the embodiments may be stored in a computer-readable storage medium. Based on such an understanding, the technical solution of the present application substantially or parts making contributions to the prior art or all or part of the technical solution may be embodied in form of a software product, and the computer software product is stored in a storage medium to execute all or part of the steps of the method in each embodiment of the present application. The storage medium includes various media capable of storing program codes, such as a U disk, a mobile hard disk, a Read-Only Memory (ROM), a RAM, an electrically erasable programmable ROM, a register, a hard disk, a mobile disk, a Compact Disk Read-Only Memory (CD-ROM), a magnetic disk, or an optical disk.

Figure 4:
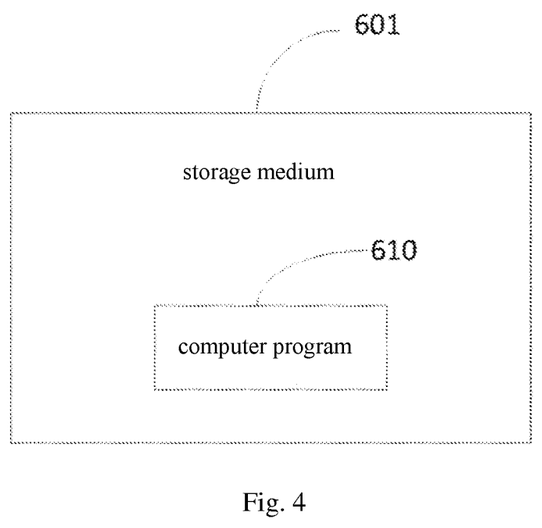
FIG. 4 is a schematic structural diagram of some implementation modes of a storage medium according to some embodiments of the present application.

Based on this, some embodiments of the present application also provide a computer-readable storage medium. Referring to FIG. 4, FIG. 4 is a schematic structural diagram of some implementation modes of a storage medium according to some embodiments of the present application. The storage medium 601 stores a storage system boot program 610. The storage system boot program 610 is executed by a processor to implement any steps of the storage system boot method as described in any one of the above-mentioned embodiments.

The function of each function module of the computer-readable storage medium 601 as described in the embodiments of the present application may be realized according to the method in the method embodiment, and a realization process thereof may refer to the related descriptions in the method embodiment, and will not be elaborated herein.

It can be seen from the above that, in the embodiments of the present application, it is ensured that a storage system may work normally and safely after booting, normal connection of a hardware device that the storage system depends on in quality inspection of a BIOS is ensured, the probability of system error caused by a device exception after booting of the storage system is reduced, and the stability and maintainability of the whole system are improved.

Each embodiment in the specification is described progressively. Descriptions made in each embodiment focus on differences from the other embodiments, and the same or similar parts in each embodiment refer to the other embodiments. The apparatus disclosed in the embodiments corresponds to the method disclosed in the embodiments, and thus is described relatively briefly, and related parts refer to the descriptions about the method.

Professionals may further realize that the units and algorithm steps of each example described in combination with the embodiments disclosed herein may be implemented by electronic hardware, computer software, or a combination thereof. For clarity of description about the exchangeability of hardware and software, the compositions and steps of each example have been generally described in the foregoing descriptions according to functions. Whether these functions are executed by hardware or software depends on applications and design constraints of the technical solutions. Professionals may realize the described functions for each application by use of different methods, but such realization shall fall within the scope of the present application.

The storage system boot method and apparatus and computer-readable storage medium provided in the present application are introduced above in detail. The principle and implementation modes of the present application are described herein with examples, and the descriptions about the above embodiments are only for helping understand the method and core idea of the present application. It is to be pointed out that those ordinarily skilled in the art may further make a plurality of improvements and modifications to the present application without departing from the principle of the present application, and these improvements and modifications shall also fall within the scope of protection of the claims of the present application.

The invention claimed is:

1. A storage system boot method, comprising:
   determining, based on a hardware connection method on a motherboard, a bus number, a device number, and a function number of a bridge device for connecting a Peripheral Component Interconnect Express (PCIe) device with a Central Processing Unit (CPU), so as to position a configuration space of the bridge device;
   during boot of a Basic Input Output System (BIOS), after completion of initialization of the PCIe device is detected, determining, according to connection information of a preset hardware device read from the configuration space, whether the preset hardware device is successfully connected, wherein the preset hardware device is a hardware device associated with a storage system on the motherboard;

in response to a determination that the preset hardware device is successfully connected, continuing booting the BIOS until the boot of the BIOS is finished;

in response to a determination that the preset hardware device fails to be connected, sending, by the CPU, a reconnection instruction to stabilize a speed of a PCIe hardware link in a matched state by means of adjusting a parameter of a sending end and a parameter of a receiving end;

in response to a detection that a number of times that the CPU sends the reconnection instruction is greater than a first preset value and a detection that the preset hardware device fails to be connected, sending, by the BIOS, a system reboot instruction; and in response to a detection that the number of times that the CPU sends the reconnection instruction is not greater than the first preset value, continuing to determine whether the preset hardware device is successfully connected after waiting for a preset duration.

2. The storage system boot method according to claim 1, wherein the stabilizing a speed of a PCIe hardware link in a matched state by means of adjusting a parameter of a sending end and a parameter of a receiving end comprises:

modifying a default preset value to a preset parameter value, and sending the preset parameter value to the PCIe device at a Gen1 rate or a Gen2 rate; and in response to a determination that the PCIe hardware link reaches a Gen3 rate, and a detected error rate of each receiving end is less than $1e^{-4}$, adjusting the parameter of the sending end and the parameter of the receiving end until the detected error rate of each receiving end is less than $1e^{-12}$, so as to stabilize a two ends parameterized link in a Gen3 state, wherein the adjusting the parameter of the sending end and the parameter of the receiving end comprises:

adjusting, by the PCIe device, a receiving parameter according to a first preset parameter adjusting range so as to optimize a sending parameter of the CPU; and adjusting, by the CPU, the receiving parameter according to a second preset parameter adjusting range so as to optimize a sending parameter of the PCIe device.

3. The storage system boot method according to claim 2, wherein the determining, according to connection information of a preset hardware device read from the configuration space, whether the preset hardware device is successfully connected comprises:

determining whether a connection state of the preset hardware device read from the configuration space is an incorrectly connected state or whether a connection bandwidth is x0;

in response to a determination that the connection state of the preset hardware device read from the configuration space is the incorrectly connected state or the connection bandwidth is x0, determining that the preset hardware device fails to be connected; and in response to a determination that the connection state of the preset hardware device read from the configuration space is not the incorrectly connected state and the connection bandwidth is not x0, determining that the preset hardware device is successfully connected.

4. The storage system boot method according to claim 1, wherein the sending, by the BIOS, a system reboot instruction comprises:

sending, by the BIOS, a global reset command to reboot a whole system; and in response to a determination that a number of times that the BIOS sends the global reset command is greater than a second preset value, and the preset hardware device fails to be connected, generating an alert log, sending the alert log to a Baseboard Management Controller (BMC), and simultaneously continuing booting the BIOS until the boot of the BIOS is finished, wherein the alert log comprises alert prompting information and log records from time when the boot of the BIOS is started to current time.

5. The storage system boot method according to claim 4, comprising reading a value of the number of times that the BIOS sends the global reset command from a Complementary Metal Oxide Semiconductor (CMOS) register.

6. The storage system boot method according to claim 1, wherein before the determining, according to connection information of a preset hardware device read from the configuration space, whether the preset hardware device is successfully connected, the storage system boot method comprises:

presetting a connection state standard value corresponding to that the preset hardware device is successfully connected;

wherein the determining, according to connection information of a preset hardware device read from the configuration space, whether the preset hardware device is successfully connected comprises:

determining whether a connection state value of the preset hardware device read from the configuration space is the connection state standard value;

in response to a determination that the connection state value of the preset hardware device read from the configuration space is the connection state standard value, determining that the preset hardware device is successfully connected; and in response to a determination that the connection state value of the preset hardware device read from the configuration space is not the connection state standard value, determining that the preset hardware device fails to be connected.

7. The storage system boot method according to claim 1, wherein before the determining, according to connection information of a preset hardware device read from the configuration space, whether the preset hardware device is successfully connected, the storage system boot method comprises:

presetting a connection bandwidth standard value corresponding to that the preset hardware device is successfully connected;

wherein the determining, according to connection information of a preset hardware device read from the configuration space, whether the preset hardware device is successfully connected comprises:

determining whether a connection bandwidth value of the preset hardware device read from the configuration space is the connection bandwidth standard value;

in response to a determination that the connection bandwidth value of the preset hardware device read from the configuration space is the connection bandwidth standard value, determining that the preset hardware device is successfully connected; and in response to a determination that the connection bandwidth value of the preset hardware device read from the configuration space is not the connection bandwidth standard value, determining that the preset hardware device fails to be connected.

8. A storage system boot apparatus, comprising:
at least one processor; and
a memory storing a computer program configured to run in the at least one processor, wherein the at least one processor executes the computer program to:
determine, based on a hardware connection method on a motherboard, a bus number, a device number, and a function number of a bridge device for connecting a Peripheral Component Interconnect Express (PCIe) device with a Central Processing Unit (CPU), so as to position a configuration space of the bridge device;
during boot of a Basic Input Output System (BIOS), after completion of initialization of the PCIe device is detected, determine, according to connection information of a preset hardware device read from the configuration space, whether the preset hardware device is successfully connected, wherein the preset hardware device is a hardware device associated with a storage system on the motherboard;
in response to a determination that the preset hardware device is successfully connected, continue booting the BIOS until the boot of the BIOS is finished;
in response to a determination that the preset hardware device fails to be connected, send, by the CPU, a reconnection instruction to stabilize a speed of a PCIe hardware link in a matched state by means of adjusting a parameter of a sending end and a parameter of a receiving end;
in response to a detection that a number of times that the CPU sends the reconnection instruction is greater than a first preset value and a detection that the preset hardware device fails to be connected, send, by the BIOS, a system reboot instruction; and
in response to a detection that the number of times that the CPU sends the reconnection instruction is not greater than the first preset value, continue to determine whether the preset hardware device is successfully connected after waiting for a preset duration.

9. The storage system boot apparatus according to claim 8, wherein in order to stabilize the speed of the PCIe hardware link in the matched state by means of adjusting the parameter of the sending end and the parameter of the receiving end, the at least one processor, upon execution of the computer program, is configured to:
in response to a determination that the PCIe hardware link reaches a Gen3 rate, and a detected error rate of each receiving end is less than $1e^{-4}$, adjust the parameter of the sending end and the parameter of the receiving end until the detected error rate of each receiving end is less than $1e^{-12}$, so as to stabilize a two ends parameterized link in a Gen3 state,
wherein in order to adjust the parameter of the sending end and the parameter of the receiving end, the at least one processor, upon execution of the computer program, is configured to:
adjust, by the PCIe device, a receiving parameter according to a first preset parameter adjusting range so as to optimize a sending parameter of the CPU; and adjust, by the CPU, the receiving parameter according to a second preset parameter adjusting range so as to optimize a sending parameter of the PCIe device.

10. The storage system boot apparatus according to claim 9, wherein in order to determine, according to the connection information of the preset hardware device read from the configuration space, whether the preset hardware device is successfully connected, the at least one processor, upon execution of the computer program, is configured to:
determine whether a connection state of the preset hardware device read from the configuration space is an incorrectly connected state or whether a connection bandwidth is x0;
in response to a determination that the connection state of the preset hardware device read from the configuration space is the incorrectly connected state or the connection bandwidth is x0, determine that the preset hardware device fails to be connected; and
in response to a determination that the connection state of the preset hardware device read from the configuration space is not the incorrectly connected state and the connection bandwidth is not x0, determine that the preset hardware device is successfully connected.

11. The storage system boot apparatus according to claim 8, wherein in order to send, by the BIOS, the system reboot instruction, the at least one processor, upon execution of the computer program, is configured to:
send, by the BIOS, a global reset command to reboot a whole system; and
in response to a determination that a number of times that the BIOS sends the global reset command is greater than a second preset value, and the preset hardware device fails to be connected, generating an alert log, send the alert log to a Baseboard Management Controller (BMC), and simultaneously continue booting the BIOS until the boot of the BIOS is finished, wherein the alert log comprises alert prompting information and log records from time when the boot of the BIOS is started to current time.

12. The storage system boot apparatus according to claim 11, wherein the at least one processor, upon execution of the computer program, is configured to:
read a value of the number of times that the BIOS sends the global reset command from a Complementary Metal Oxide Semiconductor (CMOS) register.

13. The storage system boot apparatus according to claim 8, wherein before determining, according the connection information of the preset hardware device read from the configuration space, whether the preset hardware device is successfully connected, the at least one processor, upon execution of the computer program, is configured to:
preset a connection state standard value corresponding to that the preset hardware device is successfully connected;
in order to determine, according to the connection information of the preset hardware device read from the configuration space, whether the preset hardware device is successfully connected, the at least one processor, upon execution of the computer program, is configured to:
determine whether a connection state value of the preset hardware device read from the configuration space is the connection state standard value;
in response to a determination that the connection state value of the preset hardware device read from the configuration space is the connection state standard value, determine that the preset hardware device is successfully connected; and
in response to a determination that the connection state value of the preset hardware device read from the configuration space is not the connection state standard value, determine that the preset hardware device fails to be connected.

14. The storage system boot apparatus according to claim 8, wherein before determining, according to the connection information of the preset hardware device read from the configuration space, whether the preset hardware device is successfully connected, the at least one processor, upon execution of the computer program, is configured to:
  preset a connection bandwidth standard value corresponding to that the preset hardware device is successfully connected;
  in order to determine, according to the connection information of the preset hardware device read from the configuration space, whether the preset hardware device is successfully connected, the at least one processor, upon execution of the computer program, is configured to:
  determine whether a connection bandwidth value of the preset hardware device read from the configuration space is the connection bandwidth standard value;
  in response to a determination that the connection bandwidth value of the preset hardware device read from the configuration space is the connection bandwidth standard value, determine that the preset hardware device is successfully connected; and
  in response to a determination that the connection bandwidth value of the preset hardware device read from the configuration space is not the connection bandwidth standard value, determine that the preset hardware device fails to be connected.

15. A non-transitory computer-readable storage medium, storing a storage system boot program that is executed by a processor wherein upon execution by the processor, the storage system boot program is configured to cause the processor to:
  determine, based on a hardware connection method on a motherboard, a bus number, a device number, and a function number of a bridge device for connecting a Peripheral Component Interconnect Express (PCIe) device with a Central Processing Unit (CPU), so as to position a configuration space of the bridge device;
  during boot of a Basic Input Output System (BIOS), after completion of initialization of the PCIe device is detected, determine, according to connection information of a preset hardware device read from the configuration space, whether the preset hardware device is successfully connected, wherein the preset hardware device is a hardware device associated with a storage system on the motherboard;
  in response to a determination that the preset hardware device is successfully connected, continue booting the BIOS until the boot of the BIOS is finished;
  in response to a determination that the preset hardware device fails to be connected, send, by the CPU, a reconnection instruction to stabilize a speed of a PCIe hardware link in a matched state by means of adjusting a parameter of a sending end and a parameter of a receiving end;
  in response to a detection that a number of times that the CPU sends the reconnection instruction is greater than a first preset value and a detection that the preset hardware device fails to be connected, send, by the BIOS, a system reboot instruction; and
  in response to a detection that the number of times that the CPU sends the reconnection instruction is not greater than the first preset value, continue to determine whether the preset hardware device is successfully connected after waiting for a preset duration.

16. The non-transitory computer-readable storage medium according to claim 15, wherein in order to stabilize the speed of the PCIe hardware link in the matched state by means of adjusting the parameter of the sending end and the parameter of the receiving end, the storage system boot program is configured to cause the processor to:
  in response to a determination that the PCIe hardware link reaches a Gen3 rate, and a detected error rate of each receiving end is less than 1e−4, adjust the parameter of the sending end and the parameter of the receiving end until the detected error rate of each receiving end is less than 1e−12, so as to stabilize a two ends parameterized link in a Gen3 state,
  wherein in order to adjust the parameter of the sending end and the parameter of the receiving end, the processor, upon execution of the storage system boot program, is configured to:
  adjust, by the PCIe device, a receiving parameter according to a first preset parameter adjusting range so as to optimize a sending parameter of the CPU; and adjust, by the CPU, the receiving parameter according to a second preset parameter adjusting range so as to optimize a sending parameter of the PCIe device.

17. The non-transitory computer-readable storage medium according to claim 16, wherein in order to determine, according to the connection information of the preset hardware device read from the configuration space, whether the preset hardware device is successfully connected, the storage system boot program is configured to cause the processor to:
  determine whether a connection state of the preset hardware device read from the configuration space is an incorrectly connected state or whether a connection bandwidth is x0;
  in response to a determination that the connection state of the preset hardware device read from the configuration space is the incorrectly connected state or the connection bandwidth is x0, determine that the preset hardware device fails to be connected; and
  in response to a determination that the connection state of the preset hardware device read from the configuration space is not the incorrectly connected state and the connection bandwidth is not x0, determine that the preset hardware device is successfully connected.

18. The non-transitory computer-readable storage medium according to claim 15, wherein in order to send, by the BIOS, the system reboot instruction, the storage system boot program is configured to cause the processor to:
  send, by the BIOS, a global reset command to reboot a whole system; and
  in response to a determination that a number of times that the BIOS sends the global reset command is greater than a second preset value, and the preset hardware device fails to be connected, generating an alert log, send the alert log to a Baseboard Management Controller (BMC), and simultaneously continue booting the BIOS until the boot of the BIOS is finished, wherein the alert log comprises alert prompting information and log records from time when the boot of the BIOS is started to current time.

19. The non-transitory computer-readable storage medium according to claim 18, wherein the storage system boot program is configured to cause the processor to:
  read a value of the number of times that the BIOS sends the global reset command from a Complementary Metal Oxide Semiconductor (CMOS) register.

20. The non-transitory computer-readable storage medium according to claim 15, wherein before determining, according the connection information of the preset hardware device read from the configuration space, whether the preset hardware device is successfully connected, the storage system boot program is configured to cause the processor to:
- preset a connection state standard value corresponding to that the preset hardware device is successfully connected;
- in order to determine, according to the connection information of the preset hardware device read from the configuration space, whether the preset hardware device is successfully connected, the storage system boot program is configured to cause the processor to:
- determine whether a connection state value of the preset hardware device read from the configuration space is the connection state standard value;
- in response to a determination that the connection state value of the preset hardware device read from the configuration space is the connection state standard value, determine that the preset hardware device is successfully connected; and
- in response to a determination that the connection state value of the preset hardware device read from the configuration space is not the connection state standard value, determine that the preset hardware device fails to be connected.

* * * * *